(12) United States Patent
Raghothaman

(10) Patent No.: US 6,987,952 B2
(45) Date of Patent: Jan. 17, 2006

(54) APPARATUS, AND ASSOCIATED METHOD, FOR EFFECTUATING TRANSMIT DIVERSITY IN A COMMUNICATION SYSTEM

(75) Inventor: Balaji Raghothaman, Allen, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/260,070

(22) Filed: Sep. 30, 2002

(65) Prior Publication Data

US 2004/0067738 A1 Apr. 8, 2004

(51) Int. Cl.
H04B 1/02 (2006.01)
(52) U.S. Cl. ...................... 455/101; 455/103; 455/464; 370/335; 370/437
(58) Field of Classification Search ................ 455/101, 455/103, 102, 133, 63, 62, 69, 67.11, 67.14, 455/504, 115.1, 65, 500, 13.3, 452.1, 277.2, 455/453, 277.1, 455, 561, 464, 161.3, 422, 455/435.2, 63.1, 575.1, 550.1, 562.1; 375/267, 375/279, 284, 358, 141, 146–148, 58, 60; 343/705, 725; 370/725, 835, 334, 339, 209, 370/441, 201, 342, 442, 535, 130, 203, 208, 370/335, 320, 479
See application file for complete search history.

(56) References Cited

U.S. PATENT DOCUMENTS

| 5,628,052 A | * | 5/1997 | DeSantis et al. ......... 455/562.1 |
| 6,594,473 B1 | * | 7/2003 | Dabak et al. ............... 455/101 |
| 6,804,307 B1 | * | 10/2004 | Popović ...................... 375/299 |
| 2002/0077141 A1 | * | 6/2002 | Hwang et al. .............. 455/522 |
| 2002/0150065 A1 | * | 10/2002 | Ponnekanti ................ 370/334 |
| 2003/0035490 A1 | * | 2/2003 | Gollamudi .................. 375/267 |
| 2003/0156572 A1 | * | 8/2003 | Hui et al. ................... 370/349 |
| 2004/0001556 A1 | * | 1/2004 | Harrison et al. ............ 375/267 |
| 2004/0052315 A1 | * | 3/2004 | Thielecke et al. .......... 375/299 |

* cited by examiner

*Primary Examiner*—Edward F. Urban
*Assistant Examiner*—Charles Chow
(74) *Attorney, Agent, or Firm*—G. Peter Albert, Jr.; Foley & Lardner LLP

(57) ABSTRACT

Apparatus, and an associated method, for facilitating communications in a non-ideal communication system. Data to be communicated by a sending station to a receiving station selectably utilizes an open-loop transmit diversity scheme and a closed-loop transmit diversity scheme. A determiner at the receiving station determines closed-loop feedback information and a determiner thereat also determines the reliability to be associated with such feedback information. The reliability indications and the feedback indications are returned to the sending station. And a selector positioned thereat selects in what manner to utilize open-loop and closed-loop transmit diversity for subsequent communications.

15 Claims, 2 Drawing Sheets

APPARATUS, AND ASSOCIATED METHOD, FOR EFFECTUATING TRANSMIT DIVERSITY IN A COMMUNICATION SYSTEM

The present invention relates generally to a manner by which to utilize transmit diversity in a cellular, or other radio, communication system. More particularly, the present invention relates to apparatus, and an associated method, by which selectably to utilize one or more types of transmit diversity at a sending station.

A closed-loop transmit diversity scheme is utilized when feedback values, used in the closed-loop scheme, are determined to be reliable. If the feedback values are determined not to be reliable, the closed-loop transmit diversity scheme is not utilized. And, an open-loop transmit diversity scheme that operates without the need of feedback information is utilized. When the feedback information cannot be timely provided or is otherwise unreliable, closed-loop transmit diversity is not utilized. And, open-loop transmit diversity is provided. When the feedback information is reliable, closed-loop transmit diversity is used to facilitate improved communications in the communication system.

BACKGROUND OF THE INVENTION

A communication system is formed, at a minimum, of a set of communication stations interconnected by way of a communication channel. At least a first communication station of the set of communication stations forms a sending station, and at least another of the communication stations forms a receiving station. Data is communicated by the sending station to the receiving station by way of the communication channel. A sending station, if necessary, converts the data into a form to permit its communication upon the communication channel. And, the receiving station operates to recover the informational content of the data communicated thereto.

Many different types of communication systems have been developed and implemented to effectuate many different types of communication services in which data is communicated between separate communication stations. And, as advancements in communication technologies permit, improvements to such communication systems, as well as the development and implementation of new types of communication systems, have been, and continue to be, made.

A radio communication system is an exemplary type of communication system. Communication channels defined in a radio communication system are defined upon radio links extending between the communication stations of the radio communication system. Because radio links are utilized upon which to define communication channels, conventional wireline connections, otherwise required upon which to define the communication channels, is obviated. And, as a result, the infrastructure costs associated with radio communication systems are generally less than the infrastructure costs associated with a conventional, wireline communication system. And, use of the radio links upon which to define communication channels permits a radio communication system to be implemented as a mobile communication system.

A cellular communication system is a type of radio communication system. Radio telephonic communications are effectuable by way of a cellular communication system. And, the networks of various types of cellular communication systems have been installed throughout significant parts of the populated portions of the world.

In general, a cellular communication system includes a fixed-network infrastructure that is installed throughout a geographical area which is to be encompassed by the communication system. The fixed-network infrastructure includes a plurality of spaced-apart, fixed-site base transceiver stations. Each of the base transceiver stations defines an area, referred to as a cell, and from which the cellular communication system derives its name. The base transceiver stations are sometimes said to form part of a radio access network (RAN) part of the communication system. And, groups of the base transceiver stations are controlled by control devices that also form parts of the radio access network part of the communication system.

The radio access network part is connected to a core network, such as a PSTN (public-switched telephonic network) or a PDN (packet data network), such as the internet. Data sources, such as computer servers, as well as telephonic stations, and other communication devices are, in turn, coupled to the core network to be capable of communication therethrough.

A user communicates in the cellular communication system through the use of a mobile station, constructed to be operable therein. The mobile station forms a portable transceiver capable of sending and receiving data-containing signals upon radio channels defined upon the radio links allocated to the communication system. Due to the spaced-apart positioning of the base transceiver stations, the mobile station is generally able to communicate with at least one of the base transceiver stations when positioned at any location within the geographical area encompassed by the communication system.

The radio channels upon which the data-containing signals are communicated are susceptible to distortion, caused, e.g., by fading conditions. If the distortion is not corrected, the informational content of the data that is communicated during operation of the communication system cannot adequately be recovered.

Various techniques are utilized to compensate for, or otherwise overcome, the distortion introduced upon the data during its communication upon a radio channel.

Encoding of the data pursuant to an encoding scheme is sometimes performed. The encoding of the data increases the likelihood that the informational content of the data can be recovered.

Space diversity also is sometimes utilized. Space diversity is created through the use, at a sending station, of more than one transmit antenna transducer from which the data is transduced. Spatial redundancy is thereby provided. The antenna transducers are typically separated by distances great enough to ensure that the information communicated by the respective ones of the antenna transducers fades in uncorrelated manners. Receiving stations sometimes also include more than one spaced-apart receive antenna transducers.

Antenna weightings are sometimes utilized by which to weight data-containing signals provided to the respective ones of the antenna transducers. The antenna weightings are selected, and dynamically reselected, in manners intended to optimize the communication of the data. For instance, the antenna weightings are selected to maximize the energy levels of the data-containing signal, when received at the receiving station. A spatial diversity scheme that utilizes antenna weightings requires feedback to dynamically reselect, or otherwise alter, the antenna weightings of the respective antenna transducers. If fading conditions on the communication channel are significant, the reliability of the feedback information might not be of a level appropriate to benefit the improvement of communication quality levels of the communication of the data. Additionally, and sometimes even more significantly, the feedback information cannot be relied upon, due to its untimeliness. For instance, particularly in high-velocity situations, the feedback information is delivered too late to be reliable. Other aspects also affect the reliability. For example, the quantity of feedback (number of bits used to convey the feedback) determines its accuracy. Also, if tracking algorithms used by the receiver to "track" the progression of the weights, these tracking algorithms perform less reliably in fast fading.

A transmit diversity scheme that takes into consideration the reliability and timeliness of feedback information and would therefore be advantageous.

It is in light of this background information related to communication systems that utilize transmit diversity that the significant improvements of the present invention have evolved.

SUMMARY OF THE INVENTION

The present invention, accordingly, advantageously provides apparatus, and an associated method, by which to utilize transmit diversity in a cellular, or other radio, communication system.

Through operation of an embodiment of the present invention, a manner is provided by which selectively to utilize one or more types of transmit diversity at a sending station.

An open-loop transmit diversity scheme is provided and utilized to create transmission diversity of data that is communicated during operation of the communication system. And, a closed-loop, transmit diversity scheme is further provided and is selectably utilized when feedback values, used in the closed-loop scheme, are determined to be reliable. If the feedback values are determined not to be reliable, the closed-loop transmit diversity scheme is not utilized. Transmit diversity continues, however, to be provided through the utilization of the open-loop transmit diversity scheme, operating without the need of feedback information.

When the feedback information is less likely to be reliable, thereby limiting the effectiveness of the closed-loop transmit diversity scheme. When the level of reliability is less than a prescribed threshold, the closed-loop transmit diversity scheme is not utilized. Conversely, when the reliability of the feedback information is more likely to be high, use of the feedback information benefits communications. And, the closed-loop transmit diversity is utilized to improve the communication quality of the communication of data in the communication system.

In one aspect of the present invention, a block-encoding scheme is utilized at a sending station to block-encode the data prior to its transmission upon a radio channel to a receiving station. Through such block-encoding, the recoverability of the data is subsequent to transmission upon a nonideal channel. The block-encoding scheme comprises, for instance, an Alamouti block code. A receiving station that receives the data communicated by the sending station upon the radio channel includes a corresponding block decoder. When the block encoder forms an Alamouti block encoder, the corresponding block decoder is formed of an Alamouti block decoder.

In another aspect of the present invention, spatial diversity is also provided to the sending station. The sending station includes first and at least second spaced-apart antenna transducers, each coupled to receive the data that is to be communicated by the sending station. The weighting values by which the signal is applied to the antenna transducers are weighted are changed pursuant to a closed-loop feedback scheme. The feedback is provided by a receiving station that receives the data communicated thereto, upon separate channel paths extending from the respective ones of the antenna transducers. The receiving station operates to estimate the antenna weightings of the signals received thereat. Indications of the weighting factors, or at least their variants, with desired weighting levels to optimize communications according to a selected optimization criteria.

In another aspect of the present invention, a reliability indicia representative of the reliability of the feedback information of the closed-loop transmit diversity scheme is determined. When the closed-loop transmit diversity scheme comprises a spatial diversity scheme utilizing antenna weightings, the reliability indicia represents the reliability to be associated with feedback values related to the antenna weightings.

In another aspect of the present invention, values of the reliability indicia are determinative of whether the closed-loop transmit diversity scheme is utilized. If the reliability is beneath a selected threshold, the closed-loop transmit diversity is not utilized. And, conversely, if the reliability indicia is greater than a selected threshold, the closed-loop transmit diversity is utilized. For instance, when the reliability indicia indicates that the feedback information is more likely than not to be accurate, the closed-loop transmit diversity scheme is utilized. If the reliability indicia indicates that the feedback information is less than 50 percent reliable, the 50% number is for this particular combination of two transmit antennas, with the Alamouti code used as the open loop mode. Other values might be applicable in other situations, then the closed-loop transmit diversity scheme is not utilized.

In another aspect of the present invention, the reliability indicia is determined at the receiving station. And, once determined, the reliability indicia is returned to the sending station. Selection is then made at the sending station of the type of transmit diversity that is to be utilized in subsequent communications of the data by the sending station. Dynamic readjustment of the type of diversity is also permitted.

Both the block-encoding and the special transmit diversity, utilizing antenna weightings, can be utilized. A Unified Beamformer Space-Time Block Code (UBSTBC) is thereby provided. The weighted space time block code selectably combines a block code, such as the aforementioned Alamouti block code, with a multiple-antenna transducer configuration using channel-dependent weighting. In conditions, such as high-speed situations, in which the feedback information is less likely to be reliable, only the block coding is performed; otherwise, the weighted transmission is formed. And, weighted levels of both coding techniques can be utilized. The "selection between the closed and open loop described herein is a particular case of the weighted combination of both.

In these and other aspects, therefore, apparatus, and an associated method, is provided for a radio communication system. The radio communication system has a sending station operable pursuant to a first transmit diversity scheme and at least selectably to a second transmit diversity scheme. The sending station sends data to a receiving station upon a channel susceptible to distortion. Selection of whether to operate the sending station also pursuant to the second transmit diversity scheme is facilitated. A channel analyzer is coupled to receive indications associated with sending of the data upon the channel. The channel analyzer analyzes the indications to form therefrom channel indicia associated with the sending of the data on the channel. A reliability determiner is coupled to the channel analyzer. The reliability determiner determines reliability indicia associated with values that are associated with the indications of the channel indicia to which the channel analyzer is coupled to receive. The reliability indicia is determinative of whether to operate the sending station also pursuant to the second transmit diversity scheme.

A more complete appreciation of the present invention and the scope thereof can be obtained from the accompanying drawings that are briefly summarized below. The following detailed description of the presently-preferred embodiments of the invention, and the appended claims.

DETAILED DESCRIPTION

Figure 1:
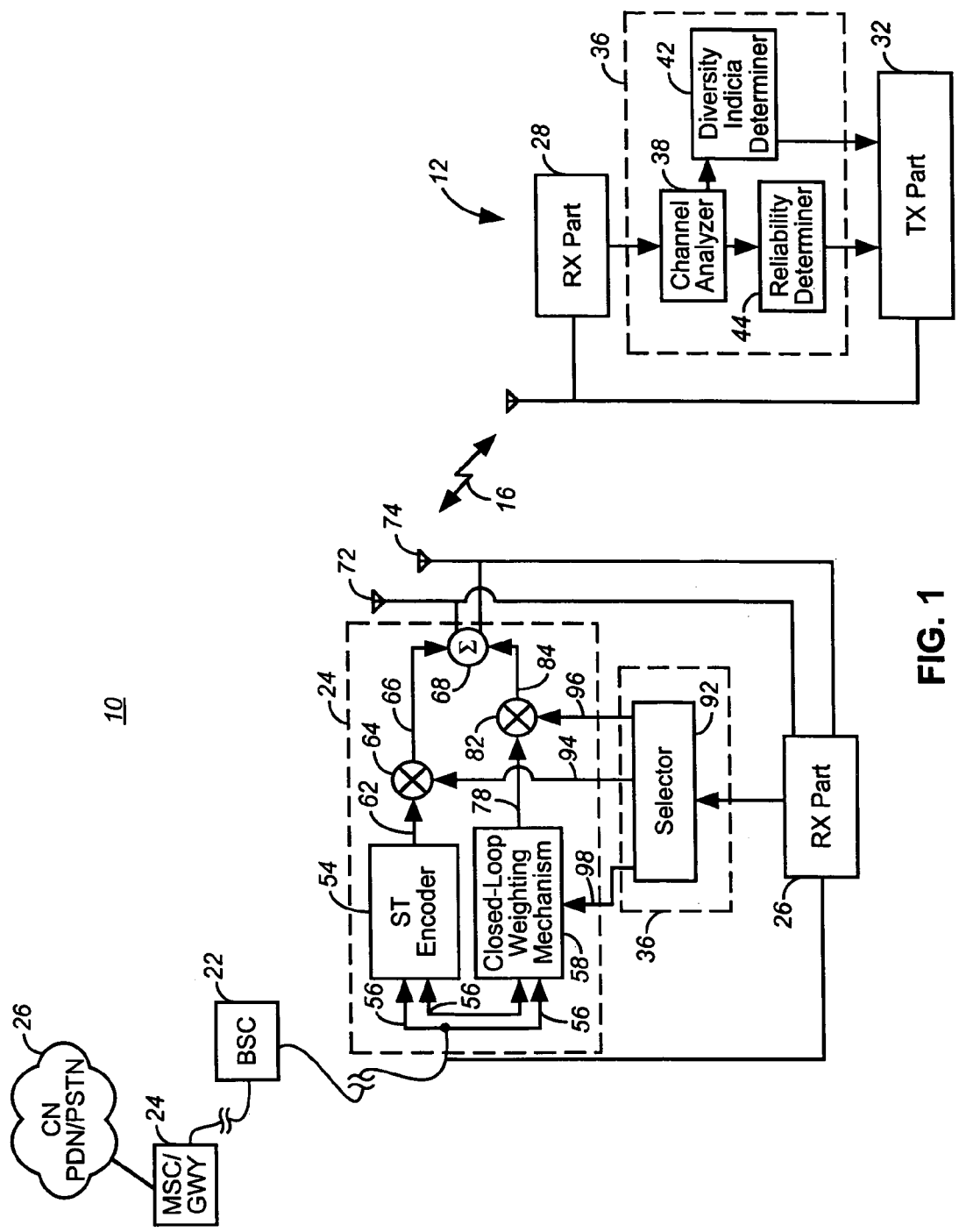
FIG. 1 illustrates a functional block diagram of a radio communication system that includes an embodiment of the present invention as a portion thereof.

Referring first to FIG. 1, a radio communication system, shown generally at 10, provides for radio communications between two, or more, communication stations here represented by a base transceiver station 14 and a mobile station 12 by way of radio channels defined upon a radio link 16 extending therebetween.

In the exemplary implementation, the radio communication system forms a cellular communication system constructed to be operable generally pursuant to a CDMA-based (code-division multiple-access-based) operating specification, such as a proposed CDMA 2000 operating specification, or other 3G-CDMA (third generation, CDMA) operational standard. While the following description shall describe operation of the communication system as a cellular communication system operable pursuant to such an operating specification, the communication system 10 is also representative of other types of cellular, and other radio, communication systems.

The base transceiver station forms part of the network infrastructure of the communication system. And, the base transceiver station is coupled to a base station controller (BSC) 22. The base station controller operates to control certain aspects of operation of the base transceiver stations to which the base station controller is coupled. The base station controller, in turn, is coupled, here by way of a gateway (GWY) 24 to a core network (CN) 26. The core network here is representative of a packet data network, such as the internet backbone. The core network is also representative of a circuit-switched network, such as a PSTN (public-switched telephonic network). In such an implementation, a mobile switching center (MSC) is utilized, and the functionality of an MSC is incorporated at the entity represented as the gateway 24 in the figure.

The base transceiver station 14 includes the circuitry of a radio transceiver capable of transceiving communication signals upon radio channels defined upon the radio link 16. And, the mobile station 12 also includes radio transceiver circuitry, also capable of transceiving communication signals upon the radio channels defined upon the radio link 16.

Signals communicated by the base transceiver station to the mobile station are referred to as being forward-link signals. The forward-link signals are communicated upon forward-link channels defined upon a forward link of the radio link. And, signals originated at the mobile station and communicated upon the radio link are referred to as being reverse-link signals. The reverse-link signals are communicated upon reverse-link channels defined upon a reverse-link of the radio link.

Accordingly, the base transceiver station includes a transmit part 24 that operates to transmit forward-link signals upon the forward-link channels to communicate, thereby, the forward-link signals to the mobile station. And, the base transceiver station includes a receive part 26 that operates to receive and operate upon reverse-link signals transmitted to the base transceiver station. Analogously, the mobile station includes a receive part 28 that operates to receive, and operate upon, forward-link signals transmitted to the mobile station. And, the mobile station includes a transmit part 32 that operates to transmit the reverse-link signals that are communicated by the mobile station to the base transceiver station.

In the exemplary implementation, the transmit part of the base transceiver station selectably utilizes transmit diversity schemes by which to facilitate communication of data upon the forward-link channels to the mobile station.

The mobile station further includes apparatus 36 of an embodiment of the present invention as a portion thereof. The apparatus is here shown to be formed of functional elements. The functional elements of the apparatus 36 are implemented in any desired manner, such as by algorithms executable by processing circuitry. In the exemplary implementation, the functions provided by the apparatus 36 are carried out by algorithms executed at a controller, forming part of the mobile station and also used to perform conventional control operations at the mobile station.

The apparatus 36 positioned at the mobile station is here shown to include a channel analyzer 38 that is coupled to the receive part 28 of the mobile station. The channel analyzer is coupled to receive indications of values of signals communicated upon the forward link channels of the radio link 16, once received at the receive part of the mobile station. And, the channel analyzer operates to extract and analyze such values. The channel analyzer is coupled to a diversity indicia determiner 42. The diversity indicia determiner operates to determine desired values of the diversity indicia to optimize communications pursuant to a selected optimization scheme. In the exemplary implementation, and as shall be noted more fully below, in the exemplary implementation, the base transceiver station utilizes space diversity in which weightings are applied to signals transduced by respective ones of the antennas. In such an embodiment, the diversity indicia determiner determines desired weightings that should be applied to optimize communications pursuant to a selected optimization scheme. Values of the diversity indicia determined by the determiner are provided to the transmit part 32 of the mobile station for return to the base transceiver station on reverse link channels. A feedback arrangement is formed, and the communication system selectably operates pursuant to a closed-loop transmit diversity scheme.

The apparatus 36 further includes a reliability determiner 44, also coupled to the channel analyzer. The reliability determiner operates to determine a reliability indicia associated with the reliability of the diversity indicia determinations made by the diversity indicia determiner 42. And, the reliability determiner is also coupled to the transmit part 32. Reliability indications determined by the reliability determiner are returned to the base transceiver station to be used thereat.

The transmit part of the base transceiver station is here shown to include an open-loop space-time (ST) encoder 54 coupled to receive data, here applied by way of the lines 56, that is to be communicated by the base transceiver station. And, the transmit part of the base transceiver station is also shown to include a closed-loop weighting mechanism 58, also coupled to the lines 56 upon which data that is to be communicated by the base transceiver station is provided. In the exemplary implementation, the space time encoder forms a rate 1 Alamouti block encoder. In other implementations, the encoder operates pursuant to another encoding scheme. Encoded data generated by the encoder 54 is generated on the lines 62 that are applied to a mixer 64. Mixed signals generated by the mixer 64 are generated on the line 66 and provided to a summing element 68. Summed values generated by the summing element 68 are provided to multiple antennas, here antennas 72 and 74 forming spaced-apart antennas according to a space diversity scheme.

The closed loop weighting element 58 operates to generate weighted signals on the line 78 that are applied to a mixer 82. Mixed signals are generated on the lines 84. And, the lines 84 are applied to the summing element 68. Summed values generated by the summing element 68 are, as just-noted, provided to the antenna 72 and 74.

The base transceiver station also includes apparatus 36 of an embodiment of the present invention. Again, the elements of the apparatus 36 are functionally represented, and the elements thereof are implemented in any desired manner, such as, again, as algorithms executable by processing circuitry. Here, the apparatus includes a selector 92. The selector 92 is coupled to the receive part 26 to receive indications of the values of the diversity indicia and values of the reliability indications formed at the mobile station and returned to the base transceiver station pursuant to a feedback arrangement on the reverse-link channels of the radio link 16.

The selector is coupled to the mixers 64 and 82 by way of the lines 94 and 96, respectively. And, the selector is also coupled to the closed loop weighting mechanism by way of the lines 98. Values representative of the weightings that are to be applied to signals applied to the antennas 72 and 74 by the closed loop weighting mechanism are provided thereto on the line 98. And, a reliability indicia is provided to the mixer 64 by way of the line 94. And, the square root of one minus the squared value of the reliability indicia is provided to the mixer 82 by way of the line 96. In the exemplary implementation in which the space time encoder 54 performs Alamouti block-encoding, the values generated on the lines 94 and 96 are of values 1 and 0. And, accordingly, signals are generated on either of the lines 66 or 84, but not, simultaneously, on both of the lines 66 and 84. And, the summed signal formed by the summing element 68 corresponds to the values generated on the lines 66 or 84, respectively. In other implementations, i.e., implementations utilizing an encoding scheme other than the Alamouti block encoder at the space time encoder 54, other values are generated on the lines 94 and 96. And, the summed values formed by the summing element 68 form a combination of the values generated upon the separate paths of the transmit part of the base transceiver station.

Selection is made at the selector 92, of what values to generate on the lines 94 and 96. And, thereby, the selector selects which, or which combination of, the diversity mechanisms are utilized.

In high-speed conditions, open loop transmit diversity works well. But, closed-loop transmit diversity works fairly poorly due to the unreliability, i.e., untimeliness, of the feedback information. Conversely, in slow-speed conditions, closed-loop schemes generally work well. Reliability determinations made by the reliability determiner 44, and corresponding selections made by the selector 92 responsive thereto, accordingly, cause values to be generated on the lines 94 and 96 to cause selection of the appropriate diversity scheme. And, as a result, communication qualities are optimized for the communication conditions upon which the data is to be communicated by the base transceiver station to the mobile station.

A Unified Beamformer Space-Time Block Code (UB-STBC) is thereby provided in the exemplary implementation as a combination of the Alamouti block coding, for two transmit antennas, is combined with a channel-dependent weighting scheme. Variation of the coding is dependent, here, upon the reliability determination and, that skews the coding towards the Alamouti block coding or the weighted transmission scheme. Feedback is provided by the mobile station to the base transceiver station, in the exemplary implementation, pursuant to a perturbation feedback approach.

Following is a mathematical explanation of operation, and substantiation of, the exemplary embodiment of the present invention.

The Alamouti block code for two transit antennas is well known. Let there be two independent non frequency selective (flat) Rayleigh fading channels emanating from the two transmit antennas. The signal at the receiver antenna over two time epochs is given by $$\begin{bmatrix} r_1 \\ r_2 \end{bmatrix} = \sqrt{\frac{E_s}{2}} \begin{bmatrix} s_1 & s_2 \\ -s_2^* & s_1^* \end{bmatrix} \begin{bmatrix} h_1 \\ h_2 \end{bmatrix} + \begin{bmatrix} n_1 \\ n_2 \end{bmatrix} \quad \text{(equation 1)}$$

The above can be rewritten as:

$$\begin{bmatrix} r_1 \\ r_2^* \end{bmatrix} = \sqrt{\frac{E_s}{2}} \begin{bmatrix} h_1 & h_2 \\ h_2^* & -h_1^* \end{bmatrix} \begin{bmatrix} s_1 \\ s_2 \end{bmatrix} + \begin{bmatrix} n_1 \\ n_2^* \end{bmatrix}, \quad \text{(equation 2)}$$

and thus can be decoded as:

$$\begin{bmatrix} \hat{s}_1 \\ \hat{s}_2 \end{bmatrix} = \begin{bmatrix} h_1^* & h_2 \\ h_2^* & -h_1^* \end{bmatrix} \begin{bmatrix} r_1 \\ r_2^* \end{bmatrix} \quad \text{(equation 3)}$$

$$= \sqrt{\frac{E_s}{2}} (|h_1|^2 + |h_2|^2) \begin{bmatrix} s_1 \\ s_2 \end{bmatrix} + \begin{bmatrix} \hat{n}_1 \\ \hat{n}_2^* \end{bmatrix}$$

The code is modified by using a weighting matrix, thus obtaining a Unified Beamformer Space-Time Block Code (UBSTBC) as follows:

$$\begin{bmatrix} r_1 \\ r_2 \end{bmatrix} = \begin{bmatrix} s_1 & s_2 \\ -s_2^* & s_1^* \end{bmatrix} \begin{bmatrix} \sqrt{1-\alpha^2}\,\omega_1^* + \frac{\alpha}{\sqrt{2}} & \sqrt{1-\alpha^2}\,\omega_2^* \\ 0 & \frac{\alpha}{\sqrt{2}} \end{bmatrix} \quad \text{(equation 4)}$$

-continued $$\begin{bmatrix} h_1 \\ h_2 \end{bmatrix} + \begin{bmatrix} n_1 \\ n_2 \end{bmatrix}$$

where $\alpha \in R, 0 \leq \alpha \leq 1$, and $\omega_1, \omega_2 \in C, |\omega_1|^2 + |\omega_1|^2 = 1$. Equation (4) can be reformulated as an Alamouti code with a different set of channel coefficients:

$$\begin{bmatrix} r_1 \\ r_2^* \end{bmatrix} = \sqrt{\frac{E_s}{2}} \begin{bmatrix} \bar{h}_1 & \bar{h}_2 \\ \bar{h}_1^* & -\bar{h}_1^* \end{bmatrix} \begin{bmatrix} s_1 \\ s_2 \end{bmatrix} + \begin{bmatrix} n_1 \\ n_2^* \end{bmatrix} \text{ where} \quad \text{(equation 5)}$$

$$\begin{bmatrix} \bar{h}_1 \\ \bar{h}_2 \end{bmatrix} = \begin{bmatrix} \left( \sqrt{1-\alpha^2} \, \omega_1^* h_1 + \frac{\alpha}{\sqrt{2}} h_1 + \sqrt{1-\alpha^2} \, \omega_2^* h_2 \right) \\ \frac{\alpha}{\sqrt{2}} h_2 \end{bmatrix} \quad \text{(equation 6)}$$

This leads to a modified decoder matrix, but essentially the same operation as the Alamouti decoder:

$$\begin{bmatrix} \hat{s}_1 \\ \hat{s}_2 \end{bmatrix} = \begin{bmatrix} \bar{h}_1^* & \bar{h}_2 \\ \bar{h}_2^* & -\bar{h}_1 \end{bmatrix} \begin{bmatrix} r_1 \\ r_2^* \end{bmatrix} \quad \text{(equation 7)}$$

To better understand the rationale in (4), it is beneficial to consider the extremities $\alpha$. When $\alpha=1$, the arrangement in (4) becomes exactly equivalent to the Alamouti scheme of (2). At the other end, when $\alpha=0$, the system lapses to a weighted transmission, that is to say, it becomes a spatial beamformer as opposed to a space-time block code:

$$\begin{bmatrix} r_1 \\ r_2 \end{bmatrix} = \sqrt{E_s} \begin{bmatrix} s_1 & 0 \\ 0 & -s_2^* \end{bmatrix} \begin{bmatrix} w_1^* h_1 + w_1^* h_2 \\ w_1^* h_1 + w_2^* h_2 \end{bmatrix} + \begin{bmatrix} n_1 \\ n_2 \end{bmatrix} \quad \text{(equation 8)}$$

This is different from the weighted transmission described in other closed loop methods only in that every other symbol is transmitted with its real part sign-reversed ($-s_2^*$). But the receiving mechanism automatically reverses this effect. The optimal weights are derived to be the principal eigenvector of the channel matrix:

$$w_o = EV_{\max}\left[\begin{bmatrix} h_1 \\ h_2 \end{bmatrix} [h_1^* \; h_2^*]\right] = \frac{1}{\sqrt{|h_1|^2 + |h_2|^2}} \begin{bmatrix} h_1 \\ h_2 \end{bmatrix} \quad \text{(equation 9)}$$

It can be seen that $\alpha=0$ is more conducive to the situation where the closed loop weights are more reliable, while $V=1$ is conducive for the case when they are unreliable and hence cannot be used. It is generally true that, the slower the fading process, the better the channel can be tracked, and hence the better the reliability of the estimated weights $\omega_1, \omega_2$. But the reliability is dependent not only on the fading process itself, but also the algorithm used to track the weights and the mechanism used to feed them back. Hence, in order to determine $\alpha$, it is advisable to use the broader reliability measure, rather than a similar measure of the rapidity of fading. The subsequent task is to identify and quantify this criteria for reliability and determine the optimal value of $\alpha$ for any given condition of reliability.

The reliability of the weight vector $\beta$ is defined as the normalized projection of the current weight vector onto the optimal weight vector at any given instant. The transmit weight vector is assumed to be perfectly known at the receiver. The channel is also known at the receiver, using which the optimal weight vector can be estimated. Hence $\beta$ can be estimated at the receiver. The expected value, of the received signal to noise ratio derived, based on an assumed SNR. Maximizing the received signal to noise ratio is also equivalent to minimizing the probability of codeword error.

The UBSTBC can be written in the same form as the Alamouti with different channel coefficients given by (6). The received signal power, noise power and consequently signal to noise ratio for the UBSTBC (which computes to the same value for both symbol epochs in the block code), can be written as $$E_{n_1,n_2}[P_{WSTBC}/h_1, h_2, w_1, w_2, \alpha] = E_s\left(\left|h_1\left(\sqrt{1-\alpha^2}\,\omega_1 + \frac{\alpha}{\sqrt{2}}\right) + h_2\sqrt{1-\alpha^2}\,\omega_2\right|^2 + \frac{\alpha^2}{2}|h_2|^2\right)^2 \quad \text{(equation 10)}$$

$$E_{n_1,n_2}[N_{WSTBC}/h_1, h_2, w_1, w_2, \alpha] = \left(\left|h_1\left(\sqrt{1-\alpha^2}\,\omega_1 + \frac{\alpha}{\sqrt{2}}\right) + h_2\sqrt{1-\alpha^2}\,\omega_2\right|^2 + \frac{\alpha^2}{2}|h_2|^2\right)\sigma^2, \quad \text{(equation 11)}$$

$$\Gamma_{WSTBC}(h_1, h_2, w_1, w_2, \alpha) = \frac{1}{\frac{E_s}{\sigma^2}} \frac{E_{n_1,n_2}[P_{WSTBC}/h_1, h_2, w_1, w_2, \alpha]}{E_{n_1,n_2}[N_{WSTBC}/h_1, h_2, w_1, w_2, \alpha]} \quad \text{(equation 12)}$$

$$= \left(\left|h_1\left(\sqrt{1-\alpha^2}\,\omega_1 + \frac{\alpha}{\sqrt{2}}\right) + h_2\sqrt{1-\alpha^2}\,\omega_2\right|^2 + \frac{\alpha^2}{2}|h_2|^2\right)$$

$$= (w+g)^H h h^H (w+g) + \frac{\alpha^2}{2}|h_2|^2,$$

$$\text{where } w = \begin{bmatrix} w_1 \\ w_2 \end{bmatrix} \quad \text{(equation 13)}$$

$$\text{and } g = \begin{bmatrix} \frac{\alpha}{\sqrt{2}} \\ 0 \end{bmatrix} \quad \text{(equation 14)}$$

Now the reliability of the weights is introduced. At any given instant, the weight vector can be written as:

$$w = \beta w_c + \delta w_d, \text{ s.t. } |\beta|^2 + |\delta|^2 = 1, \quad \text{(equation 15)}$$

$$= \frac{1}{\sqrt{|h_1|^2 + |h_2|^2}} \left( \beta \begin{bmatrix} h_1 \\ h_2 \end{bmatrix} + \delta \begin{bmatrix} -h_2^* \\ h_1^* \end{bmatrix} \right) \quad \text{(equation 16)}$$

The vector $\omega_c$ above represents the constructive weight vector, which is the principal eigenvector of the channel matrix as seen in (9), while $\omega_d$ are the destructive weights given by the second eigenvector. Using $\omega$ from (16) in (14) and expanding the following is represented.

$$\Gamma_{WSTBC}(h_1, h_2, \alpha, \beta, \delta) = \quad \text{(equation 17)}$$

$$\overbrace{|\beta|^2(1-\alpha^2)w_c^H hh^H w_c}^{1} + \overbrace{|\delta|^2(1-\alpha^2)w_d^H hh^H w_d}^{2} + \overbrace{\frac{\alpha^2}{2}|h_2|^2}^{3} +$$

$$\overbrace{\beta\delta^*(1-\alpha^2)w_c^H hh^H w_d}^{4} + \overbrace{\beta^*\delta(1-\alpha^2)w_d^H hh^H w_c}^{5} +$$

$$\overbrace{\beta^*\alpha\sqrt{\frac{1-\alpha^2}{2}} g^H hh^H w_c}^{6} + \overbrace{\delta^*\alpha\sqrt{\frac{1-\alpha^2}{2}} g^H hh^H w_d}^{7} +$$

$$\overbrace{\beta\alpha\sqrt{\frac{1-\alpha^2}{2}} w_c^H hh^H g}^{8} + \overbrace{\delta\alpha\sqrt{\frac{1-\alpha^2}{2}} w_d^H hh^H g}^{9} +$$

$$\overbrace{\frac{\alpha^2}{2}|h_2|^2}^{10}$$

The expectation of (17) over the fading channel coefficients $h_1$, $h_2$, is taken in order to determine the expected value of the received SNR. First, observe that the term labeled 2 always vanishes, by the very definition of $\omega_d$ as the second eigenvector in a rank-1 matrix. Then, by the assumptions that $h_1$, $h_2$ are independent Rayleigh processes, and that the phase and amplitude of $h_1$ (as well as $h_2$) are independent of each other, the sum of term 4 through term 9 vanishes in the expectation.

$$E_{h_1,h_2}[\Gamma_{WSTBC}(h_1, h_2, \alpha, \beta)] = 4\left(|\beta|^2(1-\alpha^2) + \frac{\alpha^2}{2}\right) \quad \text{(equation 18)}$$

Figure 2:
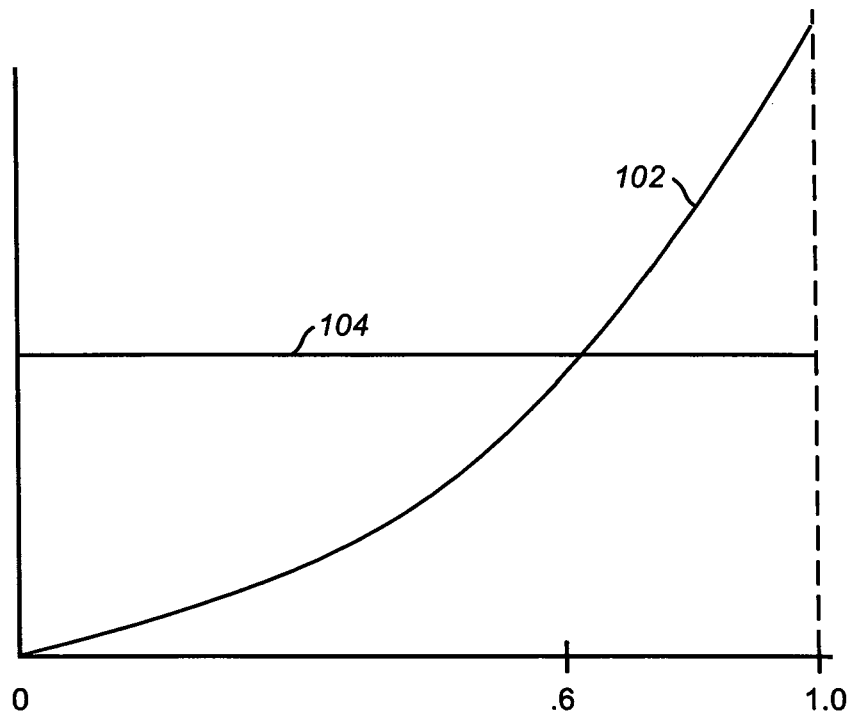
FIG. 2 illustrates a graphical representation of gain levels plotted as a function of reliability determined during operation of an embodiment of the present invention.

The plot of (18) is shown in FIG. 2.

From the figure, it is clear that $\alpha=0$, shown by the plot 102, is the optimal solution for all values of $|\beta|^2 > 0.5$, while $\alpha=1$, should the plot 104 maximizes the SNR for $|\beta|^2 < 0.5$. The conclusion is that, using this criterion, the solution is to use a fully weighted transmission mode when the reliability is greater than half, and the space-time block code otherwise. The intermediate solutions of $0 < \alpha < 1$, denoted by the dotted line 106 in FIG. (1) always lie within the outlying cases, hence will never be used. The progression of the optimal normalized gain as a function of reliability is shown by the arrows in the figure.

It has to be emphasized here that, for other criteria, or for other space-time block codes, other conclusions and implementations may be more efficient. That is to say, for other cases, there might be values of $0 < \alpha < 1$, which might be optimal for some cases of the reliability factor. But the procedure of using the reliability of the weights to emphasize closed or open loop diversity still holds good.

Figure 3:
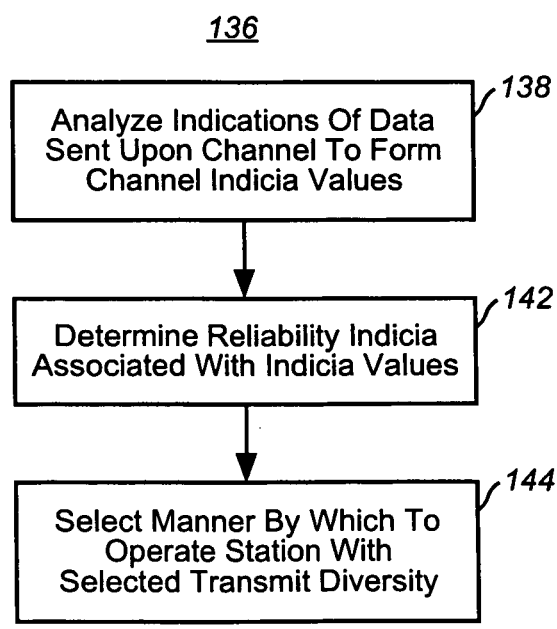
FIG. 3 illustrates a method flow diagram listing the method steps of the method of operation of an embodiment of the present invention.

FIG. 3 illustrates a method flow diagram, shown generally at 136, of an embodiment of the present invention. The method facilitates selection of whether to operate a sending station pursuant to a selected transmit diversity scheme to facilitate communications between a sending station and a receiving station.

First, and as indicated by the block 138, indications associated with sending of the data upon a channel to the receiving station are analyzed to form channel indicia associated with the sending of the data on the channel. Then, and as indicated by the block 142, reliability indicia associated with the values that are associated with the indications of the channel indicia are determined. The reliability indicia is determinative of in what manner of transmit diversity that the data shall subsequently be sent.

Then, and as indicated by the block 144, selection is made to operate the sending station with the selected transmit diversity.

Thereby, a manner is provided by which to facilitate communications in a nonideal communication system best to take advantage of the attributes of a closed-loop transmit diversity scheme and of an open-loop transmit diversity scheme.

The previous descriptions are of preferred examples for implementing the invention, and the scope of the invention should not necessarily be limited by this description. The scope of the present invention is defined by the following claims:

I claim:

1. Apparatus for a sending station, the sending station having a send part and a receive part, the send part for sending data upon a radio channel, said apparatus comprising:
    a block encoder adapted to receive the data, said block encoder for encoding the data according to a selected block coding technique and for forming a block-coded representation;
    a data-weighter adapted to receive the data, said data-weighter for weighing the data by a selected weight to form a weighter representation thereof;
    a selector coupled to the receive part and adapted to receive communication indicia forming reliability indicia of communications on the communication channel the communication indicia formed pursuant to a communication feedback scheme, said selector for selecting a first mixing value and a second mixing value responsive to values of the communication indicia, the second mixing value selected by said selector to be of a non-zero value when the values of the reliability indicia are greater than a selected threshold;
    a combiner for combining the block-coded representation of the data formed by said block encoder, modified by the first mixing value, and the weighted representation, modified by the second mixing value, together to form a weighted block coded representation of the data, the weighted block coded representation for communication upon the communication channel.

2. The apparatus of claim 1 wherein the data sent by the sending station, is sent to a receiving station upon a channel susceptible to distortion, said apparatus further comprising:
    a channel analyzer embodied at the receiving station and adapted to receive indications associated with the data, formed of the weighted block when received at the receiving station upon the channel, said channel analyzer for analyzing the indications to form therefrom channel indicia associated with the data when received at the receiving station; and a reliability determiner coupled to said channel analyzer, said reliability determiner for determining, responsive to the channel indicia formed by said channel analyzer, the reliability indicia associated with the indications received by said channel analyzer.

3. The apparatus of claim 1 further comprising:

a second transmit diversity indicia determiner also embodied at the receiving station and adapted to receive the indications associated with the data when received at the receiving station, said second transmit diversity indicia determiner for determining values of second transmit diversity indicia responsive to the indications of the data.

4. The apparatus of claim 3 wherein the receiving station comprises two-way communication station having a receive part and a transmit part, and wherein the reliability indicia determined by said reliability indicia determiner is provided to the transmit part of the receiving station to be transmitted to the sending station pursuant to the communication feedback scheme.

5. The apparatus of claim 4 wherein the values of the second transmit diversity indicia determined by said second transmit diversity indicia determiner are also provided to the transmit part of the receiving station to be transmitted to the sending station pursuant to the feedback scheme.

6. The apparatus of claim 4 wherein the sending station further comprises a first antenna transducer and a second antenna transducer spaced apart therefrom, and wherein the weighted block coded representation formed by said combiner is applied to the first and second antenna transducers, respectively.

7. The apparatus of claim 1 wherein said selector selects a zero value of the second mixing value when the values of the reliability indicia are less than a selected threshold.

8. The apparatus of claim 1 wherein the selected block coding technique used by said block encoder for encoding the data comprises an Alamouti block coding technique.

9. The apparatus of claim 1 wherein said selector is further for selecting the selected weight by which said data-weighter weighs the data.

10. The apparatus of claim 1 further comprising a first mixer adapted to receive the first mixing value and the block coded representation formed by said block encoder, said first mixer for modifying the block coded representation by multiplying the block encoded representation together with the first mixing value.

11. The apparatus of claim 10 further comprising a second mixer adapted to receive the second mixing value and the weighted representation formed by said data weighter, said second mixer for modifying the weighted representation by multiplying the weighted representation together.

12. A method for a sending station that sends data upon a radio channel, said method comprising the operations of:

block-encoding the data according to a selected block coding technique to form a block-coded representation of the data;

weighting the data by a selected weight to form a weighted representation thereof;

selecting, responsive to a value of a communication indicia forming a reliability indicia formed pursuant to a communication feedback scheme, a first mixing value and a second mixing value, the second mixing value selected to be of a nonzero value when the values of the reliability indicia are greater than a selected threshold, and combining together the block-coded representation, modified by the first mixing value, and the weighted representation, modified by the second mixing value, to form a weighted block coded representation for communication upon the communication channel.

13. The method of claim 12 further comprising the operation of sending the weighted block coded representation to a receiving station.

14. The method of claim 13 further comprising the operations of:

analyzing indications associated with the data once delivered to the receiving station to form therefrom channel indicia associated with the sending of the data on the channel; and determining, responsive to analyses performed during said operation of analyzing, reliability indicia associated with the indications analyzed during said operation of analyzing.

15. The method of claim 14 further comprising the operation of sending a value of the reliability indicia determined during said operation of determining to the sending station, and wherein the communication indicia used during said operation of selecting, comprises a representation of the value of the reliability indicia.

* * * * *